Nov. 28, 1950   M. S. MARTIN   2,531,575
WEIGHING SCOOP
Filed July 11, 1947   2 Sheets-Sheet 1
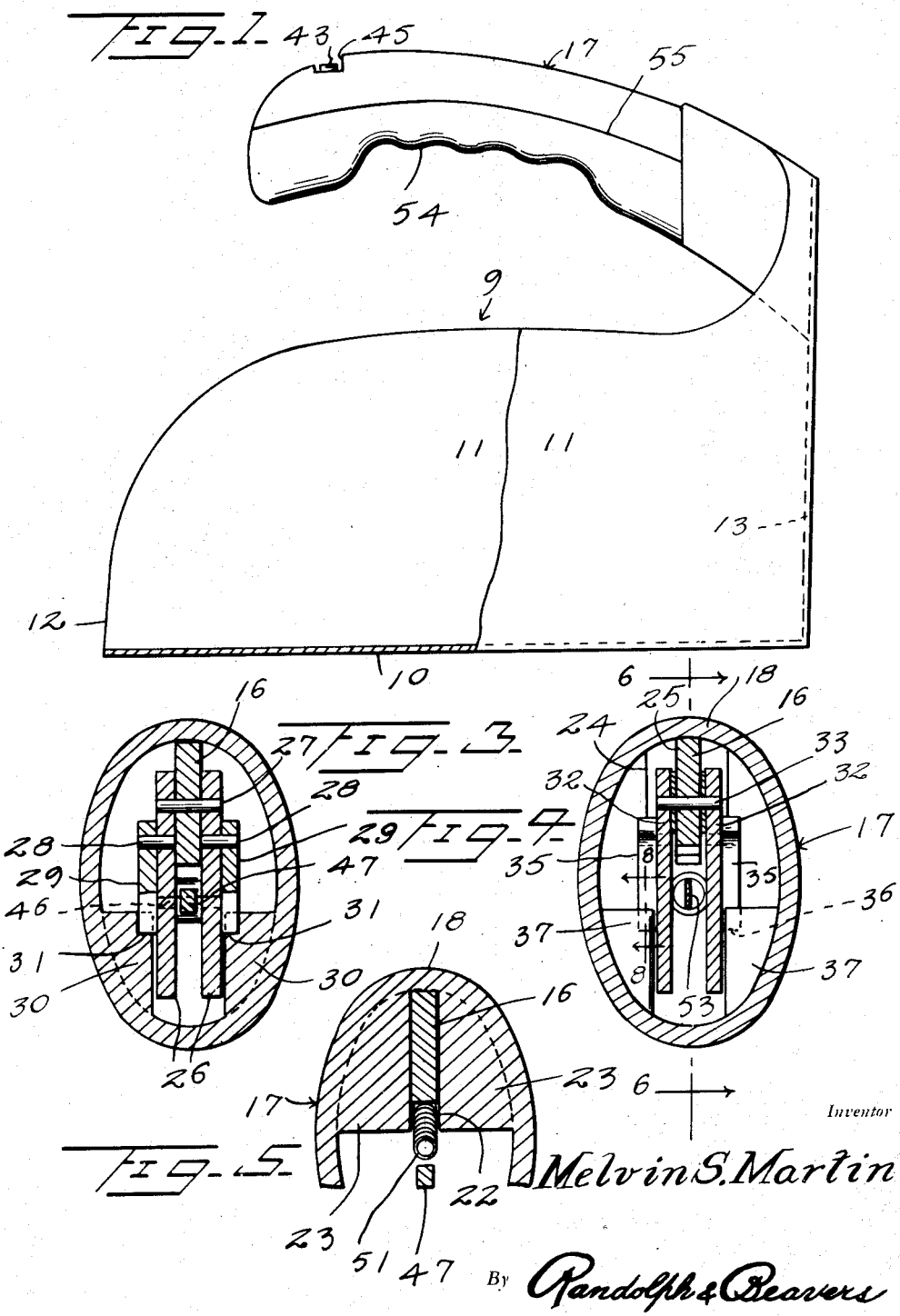
Inventor
Melvin S. Martin
By Randolph & Beavers
Attorneys

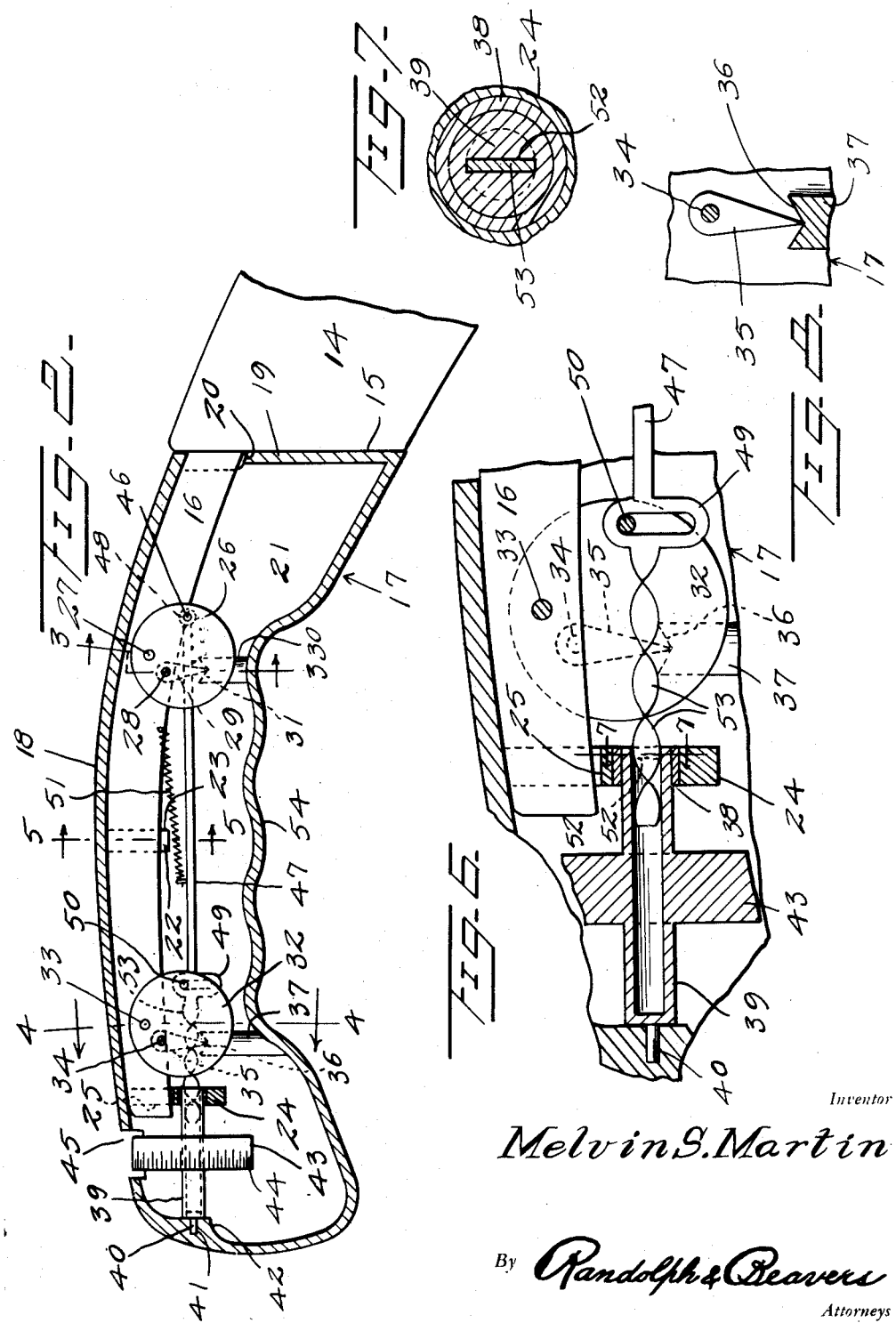

Patented Nov. 28, 1950

2,531,575

UNITED STATES PATENT OFFICE 2,531,575

WEIGHING SCOOP

Melvin S. Martin, New Holland, Pa.

Application July 11, 1947, Serial No. 760,341

7 Claims. (Cl. 265—66)

This invention relates to a scoop, such as is used for scooping up grain or other dry, finely divided material, and which is provided with a handle having weighing means for registering the weight of the contents of the scoop.

More particularly, it is an object of the present invention to provide a weighing mechanism of extremely simple and compact construction and which is adapted to be located within the hollow interior or cavity of a scoop handle for indicating the weight of the contents of the scoop.

Another object of the invention is to provide a weighing mechanism for use with a scoop having a handle disposed directly above the scoop.

A further object of the invention is to provide a weighing mechanism operative in response to a tendency of the scoop to slide relatively to the manually held handle in response to the weight of the contents of the scoop, for actuating the weighing mechanism contained within the handle.

Still a further object of the invention is to provide a weighing mechanism having spaced balancing means which are connected to insure uniform movement thereof and whereby the action of the weighing mechanism will not be affected by the location of the point at which the handle is grasped for lifting the scoop.

Various other objects and advantages of the invention will hereinafter become more fully apparent from the following description of the drawings, illustrating a preferred embodiment thereof, and wherein:

Figure 1 is a side elevational view, partly in section, showing the invention applied to a conventional scoop;

Figure 2 is an enlarged, longitudinal sectional view of the handle showing the weighing mechanism contained therein;

Figures 3, 4 and 5 are cross sectional views on enlarged scales, taken substantially along planes as indicated by the lines 3—3, 4—4 and 5—5, respectively, of Figure 2;

Figure 6 is a fragmentary, longitudinal sectional view on an enlarged scale, taken substantially along a plane as indicated by the line 6—6 of Figure 4;

Figure 7 is an enlarged cross sectional view taken substantially along a plane as indicated by the line 7—7 of Figure 6, and Figure 8 is a vertical sectional view taken substantially along a plane as indicated by the line 8—8 of Figure 4.

Referring more specifically to the drawings, the numeral 9 designates generally a substantially conventional scoop body having a bottom 10, upstanding side walls 11 which combine with the bottom 10 to define the open front end 12 of the scoop body, an upstanding rear wall 13 for closing the opposite, rear end of the scoop body, and a shank 14 which extends forwardly and upwardly from the upper portion of the rear wall 13.

As best seen in Figure 2, the shank 14 is provided with a substantially vertically disposed outer, free end 15 which is disposed substantially perpendicular to the bottom 10 and substantially parallel to the end wall 13. An elongated, curved bar 16, which is formed integral with or suitably secured to the shank 14, projects outwardly from the end 15 thereof, adjacent the upper edge of said shank 14. The bar 16 is substantially flat and is disposed with its plane substantially perpendicular to the scoop bottom 10 and is curved longitudinally so that its bottom edge is concave and its top edge convex, as clearly illustrated in Figure 2.

An elongated, hollow handle, designated generally 17, which is longitudinally curved and which is provided with a convex upper portion 18, has an inner end 19 adapted to abut against the end 15 of the shank 14 and which is closed except for an opening 20 adjacent the upper end thereof and which is shaped and sized to slidably receive the bar 16 which extends therethrough and longitudinally through a substantial portion of the hollow interior or cavity 21 of the handle 17. The upper edge of the bar 16 substantially conforms to the curvature of the upper portion 18 of the handle 17 and is disposed adjacent thereto. The intermediate portion of the bar 16 extends slidably through a slot 22 in a restriction 23, formed in the upper portion of the handle 17 and intermediate of the ends thereof, as best seen in Figure 5. The upper portion of the handle 17, adjacent its free end, is provided with a wall or restriction 24, having a slot 25 in the upper portion thereof through which the free end portion of the bar 16 reciprocally extends.

A pair of corresponding disks 26 are eccentrically pivoted to the bar 16 by a pin or shaft 27 and depend downwardly from said bar 16 and are disposed substantially intermediate of the inner end wall 19 and the restriction or wall 23 and with one of said disks 26 disposed on either side of the bar 16. As best seen in Figure 3, the disks 26 have correspondingly disposed outwardly projecting studs or pins 28 on each of which is pivotally mounted a depending, tapered balancing member 29. The pivots 28 are likewise eccentrically disposed relatively to the disks 26 but in closer proximity to the centers thereof than the pivot 27.

As best seen in Figure 3, the handle 17 is provided with internal wall portions 30, adjacent its bottom and on either side thereof, between which the lower portions of the disks 26 are disposed. The inner faces and upper edges of the wall portions 30 are provided with substantially V-shaped notches 31 forming pivot points for the tapered lower ends of the balance members 29.

A similar pair of disks 32 are mounted in the same manner as the disks 26 by a pin 33 which extends through the bar 16 and said disks 32 are disposed between the walls or restrictions 23 and the wall 24 and adjacent the latter and are also provided with outwardly projecting pins 34, disposed in the same location as the pins 28 and on each of which is pivotally mounted a balance element 35, corresponding to the balance elements 29 and the lower ends of which engage V-shaped notches 36 of walls 37 which are disposed similarly to the walls 30, with respect to the disks 26.

The wall 24, as best seen in Figure 6, is provided with a bushing 38 for journaling one end of a tubular shaft 39 the opposite end of which is closed and provided with a restricted pin or shaft extension 40 which is journaled in a recess 41 in an internal enlargement 42 which is formed in the outer, closed end of the handle 17. The hollow or tubular shaft 39 is formed integral with a relatively wide disk 43 and axially thereof and said disk 43 has its periphery calibrated, as seen at 44 in Figure 2 to provide measurements in pounds and fractions thereof. The upper portion of the handle 17, adjacent its free end, is provided with an opening 45, which may be covered by glass or other suitable transparent material to provide a window through which a portion of the calibrated or graduated periphery of the disk 43 is visible.

The disks 26 are connected for rotation in unison on the pivot 27 by a pin 46 which extends therebetween and which is eccentrically disposed relatively to said disks 26. A connecting rod 47, which extends longitudinally of the handle 17, has an inner end disposed between the disks 26 and is provided at its terminal with an eye 48 which rotatably engages the pin 46 between the disks 26. The opposite, outer end of the connection rod 47 is provided with a transversely disposed, elongated opening or loop 49 which is disposed between the disks 32 and which rotatably and slidably engages a pin 50 which extends between and connects said disks 32 and which is similarly disposed to the pin 46, so that it will be readily apparent that the two disks 26 and the two disks 32 will rotate on their pivots 27 and 33, respectively, as a unit. A contractile coiled spring 51 is fastened at one end to the connecting rod 47 and extends therefrom in a direction inwardly of the handle 17 or toward the disks 26 and is secured at its opposite end to the bar 16.

As best seen in Figure 7, the end of the tube or hollow shaft 39 which is journaled in the bushing 38 is closed except for a diametrically extending slot or opening 52. A relatively thin twisted shaft 53 is formed integral with or suitably secured to the loop 49 and projects therefrom in a direction away from the connecting rod 47 and is disposed substantially in alignment therewith. The twisted shaft 53 extends from the loop 49, between the disks 32 toward the outer end of the handle 17 and has a portion thereof disposed in the slot 52 and its free end portion disposed within the hollow tube 39, so that if said twisted shaft 53 is moved longitudinally of the tube 39 for sliding movement through the slot 52, said tube 39 will be caused to revolve in its bearings 38 and 41 to cause rotation of the disk or dial 43.

When the handle 17 is disposed in its normal, inoperative position, its inner end wall 19 will be in abutment with the shank face 15 and when so disposed the balance elements 29 and 35 will be disposed substantially vertically but with their upper ends or pivots in slightly closer proximity than their lower ends so as to provide a balance for the parts in their normal, inoperative positions.

The handle 17 is provided with a restricted under portion 54, intermediate of its ends forming a finger grip and so that the handle 17 will be grasped at an intermediate or balanced position when lifting the scoop 9. The handle 17 may be formed of any suitable metal, such as aluminum, or may be formed of plastic or other materials and is preferably composed of upper and lower sections which are suitably joined together along their mating edges, as indicated by the line 55 in Figure 1.

The spring 51 acts to counter-balance the weight of the empty scoop body 9 so that when the scoop is empty the parts will be disposed as seen in Figure 2 and with a zero graduation of the periphery of the disk or dial 43 registering with the opening or window 45. To utilize the scoop, the hollow handle 17 is grasped around the intermediate portion thereof and so that the fingers engage the recessed under side 54 and the scoop is then dipped into any material to be scooped up and weighed in a conventional manner. Obviously, as the forward end 12 of the scoop body 9 is open, said scoop must be inclined so that said open end 12 is extending generally upwardly to retain the scoop contents within the scoop body 9. The weight of the contents of the scoop body 9 will cause the bar 16 to slide outwardly of the opening 20 and the inner wall 19 of the handle 17 will thereby be moved away from the face 15 of the shank 14. As this occurs, the balancing elements 29 and 35 will maintain engagement with the V-shaped notches 31 and 36, respectively, and will rock slightly thereon and at the same time the disks 26 and 32 will turn on their pivots 27 and 33, respectively, in a clockwise direction, as seen in Figure 2. This will cause the connecting rod 47 to move longitudinally of the handle 17 and toward the dial 43 and in so moving, the twisted shaft 53 will likewise move toward the tubular shaft 39 and be caused to telescope thereinto. This movement of the twisted shaft 53 inwardly of the tubular shaft 39 will cause rotation of the shaft 39 and dial 43 in a clockwise direction, as seen in Figure 7 to thereby turn the graduated periphery or annular dial face 44 of the disk 43 for indicating the weight of the contents of the scoop body 9 through the opening 45. The spring 51 will resist this outward movement of the handle 17 relatively to the bar 16 and constitutes the counter-balancing means of the scale or weighting device. When the contents of the scoop is dumped or emptied, it will be readily apparent that the spring 51 will cause the handle 17 to return to its position of Figure 2 for again positioning the scale parts in their neutral positions of this figure and in so doing will cause the twisted shaft 53 to move outwardly of the hollow shaft 39 to turn said shaft and the disk 43 in the opposite, or counterclockwise direction.

Various modifications and changes are contemplated and may obviously be resorted to, without departing from the spirit or scope of the invention as hereinafter defined by the appended claims.

I claim as my invention:

1. In a weighing attachment for scoops, a scoop body having an open end and a closed end, a handle disposed directly above and extending longitudinally of the scoop body from the closed end toward the open end, said handle including a shank fixed to the closed end of the scoop body and having a bar forming a rigid extension thereof, a hollow handle member slidably mounted on said bar and having one end normally abutting against the outer end of said shank, yieldable means normally retaining said end of the handle member against the shank, said handle member being movable on said bar away from the shank in response to the weight of the contents of the scoop body, and scale means contained within said hollow handle member and including a calibrated dial visible therethrough, responsive to the movement of the handle member away from the shank and outwardly of said bar for indicating the weight of the contents of the scoop.

2. A weighing device as in claim 1, said scale means including a disk eccentrically pivoted to the bar, a balance element eccentrically pivoted to the disk and depending therefrom and having its lower end fulcrumed on a portion of the handle member, said disk being rotatable on its pivotal connection to the bar in response to movement of the handle member relatively to the shank and bar, and means connected to said disk and actuated in response to the movement thereof for actuating said dial.

3. In combination with a scoop body having a closed end and an open end, a shank portion fixed to the closed end and disposed over the scoop body, a stationary bar rigidly secured to and extending from the free end of said shank portion and disposed over the scoop body, a hollow handle into which said bar reciprocally extends and solely supported thereby, balancing means contained within the cavity of the handle and fulcrumed on portions thereof and having portions pivoted to the bar for swinging movement relatively thereto, a calibrated dial journaled in said handle and having a portion of its dial face exposed therethrough, and means connecting said dial to the swingably mounted portions of the balancing means whereby said dial will be actuated in response to the sliding movement of the handle relatively to said bar and shank in directions toward and away from the open and closed ends of the scoop body.

4. A weighing device as in claim 3, said balancing means including a spring connecting said last mentioned means to said bar for resisting the sliding movement of the handle outwardly of the bar.

5. A weighing device as in claim 3, said balancing means including a spring connecting said last mentioned means to said bar for resisting the sliding movement of the handle outwardly of the bar, said means for connecting said swingably mounted means to the dial including a twisted shaft, said dial having a hollow shaft provided with a slotted opening at one end thereof sized and shaped to slidably receive said twisted shaft whereby the hollow shaft and dial will be revolved by the telescoping movement of the twisted shaft relatively to said hollow shaft.

6. In combination with a scoop body having a closed end and an open end, a shank portion fixed to the closed end and disposed above the scoop body, a bar projecting from the free end of said shank portion and rigidly connected thereto, a hollow handle in which said bar is reciprocally received, said shank portion, bar and handle extending longitudinally of the scoop body from the closed end toward the open end, said handle being movable outwardly with respect to said bar and shank in response to the weight of the contents of the scoop body, counter-acting means normally urging the handle inwardly of the bar and shank, and weighing means contained within said handle and connected thereto and to said bar and operative in response to the movement of the handle relatively to the bar for indicating the weight of the contents of the scoop.

7. A weighing device as in claim 6, said weighing means including longitudinally spaced pairs of disks eccentrically pivoted to said bar and having balance elements eccentrically pivoted thereto and fulcrumed on portions of the handle, a connecting rod connecting said pairs of disks for unitary movement, a disk having a calibrated periphery forming a dial and provided with an axially disposed hollow shaft journaled in the handle and longitudinally thereof, said handle having an opening through which a portion of the calibrated periphery or dial face of the disk is exposed, said hollow shaft having a slotted opening at one end thereof, and a twisted shaft forming an extension of said connecting rod and extending through the slotted opening of said hollow shaft and engaging therewith whereby when said twisted shaft is moved longitudinally of the hollow shaft the hollow shaft and calibrated disk will be revolved.

MELVIN S. MARTIN.

REFERENCES CITED

The following references are of record in the file of this patent:

UNITED STATES PATENTS

| Number | Name | Date |
|---|---|---|
| 634,747 | Crofford | Oct. 10, 1898 |
| 1,522,316 | Nauck | Jan. 6, 1925 |
| 2,333,385 | LeBert | Nov. 2, 1943 |
| 2,363,366 | Schreiner | Nov. 21, 1944 |